United States Patent

Socci et al.

[11] Patent Number: 5,533,489
[45] Date of Patent: Jul. 9, 1996

[54] EXHAUST GAS RECIRCULATION CONTROL SYSTEM

[75] Inventors: Vincent P. Socci, Vestal, N.Y.; Ross C. Berryhill, Nashville, Ind.; Eric K. Bradley, Columbus, Ind.; Charles R. Schenk, Columbus, Ind.

[73] Assignee: Cummins Electronics Co., Columbus, Ind.

[21] Appl. No.: 413,374

[22] Filed: Mar. 30, 1995

[51] Int. Cl.$^6$ .......................... F02M 25/07; H03K 5/08
[52] U.S. Cl. .................................. 123/571; 327/335
[58] Field of Search ..................... 123/568, 569, 123/571; 73/116; 327/334, 335, 336, 339

[56] References Cited

U.S. PATENT DOCUMENTS

| | | | |
|---|---|---|---|
| 2,270,546 | 1/1942 | Neuland | 417/159 |
| 2,297,910 | 10/1942 | Neuland | 417/198 |
| 4,128,885 | 12/1978 | Valek et al. | 123/571 |
| 4,142,493 | 3/1979 | Schira et al. | 123/571 |
| 4,157,081 | 6/1979 | Wake et al. | 123/569 |
| 4,174,027 | 11/1979 | Nakazumi | 192/0.084 |
| 4,190,029 | 2/1980 | Taplin | 123/571 |
| 4,196,706 | 4/1980 | Kohama et al. | 123/568 |
| 4,217,869 | 8/1980 | Masaki | 123/438 |
| 4,224,912 | 9/1980 | Tanaka | 123/568 |
| 4,276,865 | 7/1981 | Hamai | 123/569 |
| 4,280,471 | 7/1981 | Masaki | 123/571 |
| 4,289,107 | 9/1981 | Peters | 123/571 |
| 4,381,748 | 5/1983 | Eckert et al. | 123/571 |
| 4,426,981 | 1/1984 | Greiner et al. | 123/569 |
| 4,442,820 | 4/1984 | Ina et al. | 123/571 |
| 4,452,217 | 6/1984 | Kawamura et al. | 123/571 |
| 4,466,415 | 8/1984 | Piesche | 123/569 |
| 4,474,008 | 10/1984 | Sakurai et al. | 60/605 |
| 4,548,185 | 10/1985 | Pozniak | 123/571 |
| 4,947,133 | 8/1990 | Thomas | 327/334 |
| 5,137,004 | 8/1992 | Takahata et al. | 123/571 |
| 5,150,680 | 9/1992 | Nishimura | 123/399 |

FOREIGN PATENT DOCUMENTS

2539484A1   3/1977   Germany.

OTHER PUBLICATIONS

Skebe, Stanley A., Duane C. McCormick, and Wlater M. Presz, Jr. "Parameter Effects on Mixer-Ejector Pumping Performance" (from AIAA 26th Aerospace Sciences Meeting Jan. 11–14, 1988/Reno, Nevada).

Primary Examiner—Willis R. Wolfe
Attorney, Agent, or Firm—Woodard, Emhardt, Naughton, Moriarty & McNett

[57] ABSTRACT

A control system for controlling exhaust gas recirculation in an internal combustion engine. The output of a throttle position sensor is used as an input to two parallel filters. The first filter is a lag-lead compensated filter which functions as a differentiator, producing an output proportional to the instantaneous rate of change of the throttle position.. The second filter is a fixed-rate tracking filter which generates a tracking signal that tracks the input signal. The tracking signal, however, cannot vary by more than a maximum predetermined rate. The output of the second filter is the difference between the input signal and the tracking signal. The outputs of the two filters are summed and applied to a hysteretic comparator, which turns the EGR valve off when the sum exceeds an upper threshold and turns the EGR valve back on when the sum has decayed below a lower threshold. As a result, the first filter output is largely responsible for triggering the EGR valve to turn off, while the second filter output is largely responsible for determining how long the EGR valve remains off.

35 Claims, 5 Drawing Sheets

EXHAUST GAS RECIRCULATION CONTROL SYSTEM

TECHNICAL FIELD OF THE INVENTION

The present invention relates to control systems and, more particularly, to control systems for use with exhaust gas recirculation in automotive engines.

BACKGROUND OF THE INVENTION

It is generally recognized that the production of noxious oxides of nitrogen ($NO_x$) which pollute the atmosphere are undesirable and in many cases are controlled by limits established by local, state and federal governmental regulations. The formation of $NO_x$ constituents in the exhaust gas products of an internal combustion engine must, therefore, be eliminated, minimized or at least maintained below some predetermined limit or level.

It is generally understood that the presence of $NO_x$ in the exhaust of internal combustion engines is determined by combustion temperature and amount of $NO_x$ present in the engine exhaust. It is, therefore, desirable to pressure. An increase in combustion temperature causes an increase in the control the combustion temperature in order to limit the amount of $NO_x$ present in the exhaust of an internal combustion engine.

A common method utilized in the prior art for limiting or controlling the combustion temperature has been to recirculate a portion of the exhaust gas back to the engine air intake (so-called exhaust gas recirculation or EGR). Since the exhaust gas has a higher specific heat, the combustion mixture will burn at a lower temperature. The lower combustion temperature will, in turn, reduce the amounts of $NO_x$ produced during combustion.

Prior to widespread recognition of the problems caused by exhaust emissions, it was common practice to run an internal combustion engine at or near a spark timing which produces maximum peak combustion pressures. Unfortunately, however, unacceptably high levels of $NO_x$ are produced in the combustion chambers when the engine operates at or near spark timings which produce maximum peak combustion pressure. In order to inhibit the formation and emission of $NO_x$, it is therefore desirable to limit the peak combustion pressure to a selected value.

EGR has been employed in the prior art for limiting combustion pressure since it is well known that an increase in recirculation of exhaust gases into the induction passage of the combustion chamber will reduce peak combustion pressure and thus the attendant levels of undesirable $NO_x$.

Therefore, it is generally well known that the formation of undesirable oxides of nitrogen may be reduced by recirculating a portion of the exhaust gas back to the engine air/fuel intake passage so as to dilute the incoming air/fuel mixture with inert $N_2$, $H_2O$, and $CO_2$. The molar specific heat of these gases (especially $CO_2$) absorbs substantial thermal energy so as to lower peak cycle temperatures and/or pressures to levels conducive to reducing $NO_x$ formation.

While NO formation is known to decrease as the EGR flow increases to where it represents about 20% of the exhaust gas constituents, it is also known that this is accompanied by a deterioration of engine performance including, but not limited to, an increase in engine roughness and a decrease of power output with increasing EGR. Therefore, one factor limiting the magnitude of EGR is the magnitude of EGR-induced performance deterioration or roughness that can be tolerated before vehicle driveability becomes unacceptable. Furthermore, EGR should not be turned on during load transients, as this causes "incomplete combustion" which results in black smoke from the engine exhaust. It is also usually desirable that EGR be turned off during hard acceleration so that the engine may operate at maximum power output.

Determining the proper amount of EGR under varying engine operating conditions has proved to be a complex and difficult task in the prior art. Most prior art control systems utilize at least two sensed engine parameters as inputs to the control system which controls the EGR. For example, U.S. Pat. No. 4,224,912 issued to Tanaka utilizes both engine speed and the amount of intake air as control variables. U.S. Pat. No. 4,142,493 issued to Schira et al. utilizes either engine speed and manifold absolute pressure or engine speed and throttle position. U.S. Pat. No. 4,174,027 issued to Nakazumi utilizes both clutch-actuation detection and throttle valve-opening detection as input variables to the control system. These methods all require the monitoring of several engine parameters, which may have a significant cost impact if the monitored signals are not readily available within the engine. It is, therefore, desirable to control the EGR with a single monitored engine parameter as input to the control system in order to reduce the complexity of the control system, thereby improving cost efficiency and system reliability.

Also, many of the prior art EGR control systems cannot be used with diesel engines. Diesel engines differ from spark ignition engines in a number of important ways, one being that the diesel engine does not include a valved, or throttled, intake manifold into which the combustion air is induced through a throttle and valve. Accordingly, the vacuum pressure existing in a diesel engine intake duct is slight at most. The source of vacuum pressure provided by the intake manifold of a spark ignition engine is, therefore, not available in a diesel engine. Hence, any prior art control system utilizing the vacuum pressure as an input to the control system will not work with a diesel engine.

In a diesel engine, the engine speed under a given load is controlled by the quantity of fuel injected into the engine combustion chambers and accordingly the "throttle" of the diesel engine is considered to be a manually operated foot pedal connected by a linkage to a fuel pump for supplying the engine fuel injectors. The foot operated pedal is actuated to govern the quantity of fuel delivered by the fuel pump to the combustion chambers of the engine and thus controls the engine speed under a given load. Since the quantity of fuel introduced into the combustion chamber varies, the production of $NO_x$ varies as a function of the throttle setting. This being the case, it is theoretically possible to control EGR in a diesel engine using only the throttle position as an input to the control system.

The present invention is therefore directed toward providing an EGR control system which utilizes only throttle position as an input to the control system. Such a control system could then be used with a diesel engine.

SUMMARY OF THE INVENTION

The present invention relates to a control system for controlling exhaust gas recirculation (EGR) in an internal combustion engine. The output of a throttle position sensor is used as an input to two parallel filters. The first filter is a lag-lead compensated filter which functions as a differentiator, producing an output proportional to the instantaneous rate of change of the throttle position. The second filter is a fixed-rate tracking filter which generates a tracking signal that tracks the input signal. The tracking signal, however, cannot vary by more than a maximum predetermined rate. The output of the second filter is the difference between the input signal and the tracking signal. The outputs of the two filters are summed and applied to a hysteretic comparator, which turns the EGR valve off when the sum exceeds an upper threshold and turns the EGR valve back on when the sum has decayed below a lower threshold. As a result, the first filter output is largely responsible for triggering the EGR valve to turn off, while the second filter output is responsible for determining how long the EGR valve remains off.

In one form of the invention, a control system operable to receive an input signal and generate an output signal is disclosed, comprising a first signal processor operable to produce a first signal processor output signal based upon a rate of change of the input signal; and a second signal processor operable to produce a second signal processor output signal which tracks the input signal over time, the second signal processor output signal not exceeding a predetermined maximum rate of change; wherein the system output signal comprises a summation of the first signal processor output signal and the second signal processor output signal.

In another form of the invention, an exhaust gas recirculation control system for an internal combustion engine is disclosed, comprising an input port adapted to receive an input signal indicitive of an engine operating parameter; a first signal processor operatively coupled to the input port and operable to produce a first signal processor output signal based upon a rate of change of the input signal; a second signal processor operable to produce a second signal processor output signal which tracks the input signal over time, the second signal processor output signal not exceeding a predetermined maximum rate of change; and an output port operatively coupled to the first and second signal processor and to an exhaust gas recirculation valve and operable to apply a system output signal to the exhaust gas recirculation valve wherein the system output signal comprises a summation of the first signal processor output signal and the second signal processor output signal.

In another form of the invention, an internal combustion engine providing exhaust gas recirculation is disclosed, comprising an air induction path; an exhaust path; at least one combustion chamber coupled to the air induction path and the exhaust path; an exhaust gas recirculation control valve selectively operable to couple the exhaust path to the air induction path; a control system coupled to the exhaust gas recirculation control valve, the control system comprising: an input port adapted to receive an input signal indicitive of an engine operating parameter; a first signal processor operatively coupled to the input port and operable to produce a first signal processor output signal based upon a rate of change of the input signal; a second signal processor operable to produce a second signal processor output signal which tracks the input signal over time, the second signal processor output signal not exceeding a predetermined maximum rate of change; and an output port operatively coupled to the first and second signal processors and operable to apply a system output signal to the exhaust gas recirculation valve wherein the system output signal comprises a summation of the first signal processor output signal and the second signal processor output signal.

In another form of the invention, a method of controlling a device is disclosed, comprising the steps of (a) receiving an input signal; (b) generating a first output signal based upon a rate of change of the input signal; (c) generating a second output signal which tracks the input signal over time, the second output signal not exceeding a predetermined maximum rate of change; (d) summing the first output signal and the second output signal to generate a composite output signal; and (e) applying the composite output signal to the device.

In another form of the invention, a method of controlling an exhaust gas recirculation valve on an internal combustion engine is disclosed, comprising the steps of: (a) receiving an input signal indicative of an engine operating parameter; (b) receiving an input signal based upon a rate of change of the input signal; (c) generating a second output signal which tracks the input signal over time, the second output signal not exceeding a predetermined maximum rate of change; (d) summing the first output signal and the second output signal to generate a composite output signal; and (e) applying the composite output signal to the exhaust gas recirculation valve.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
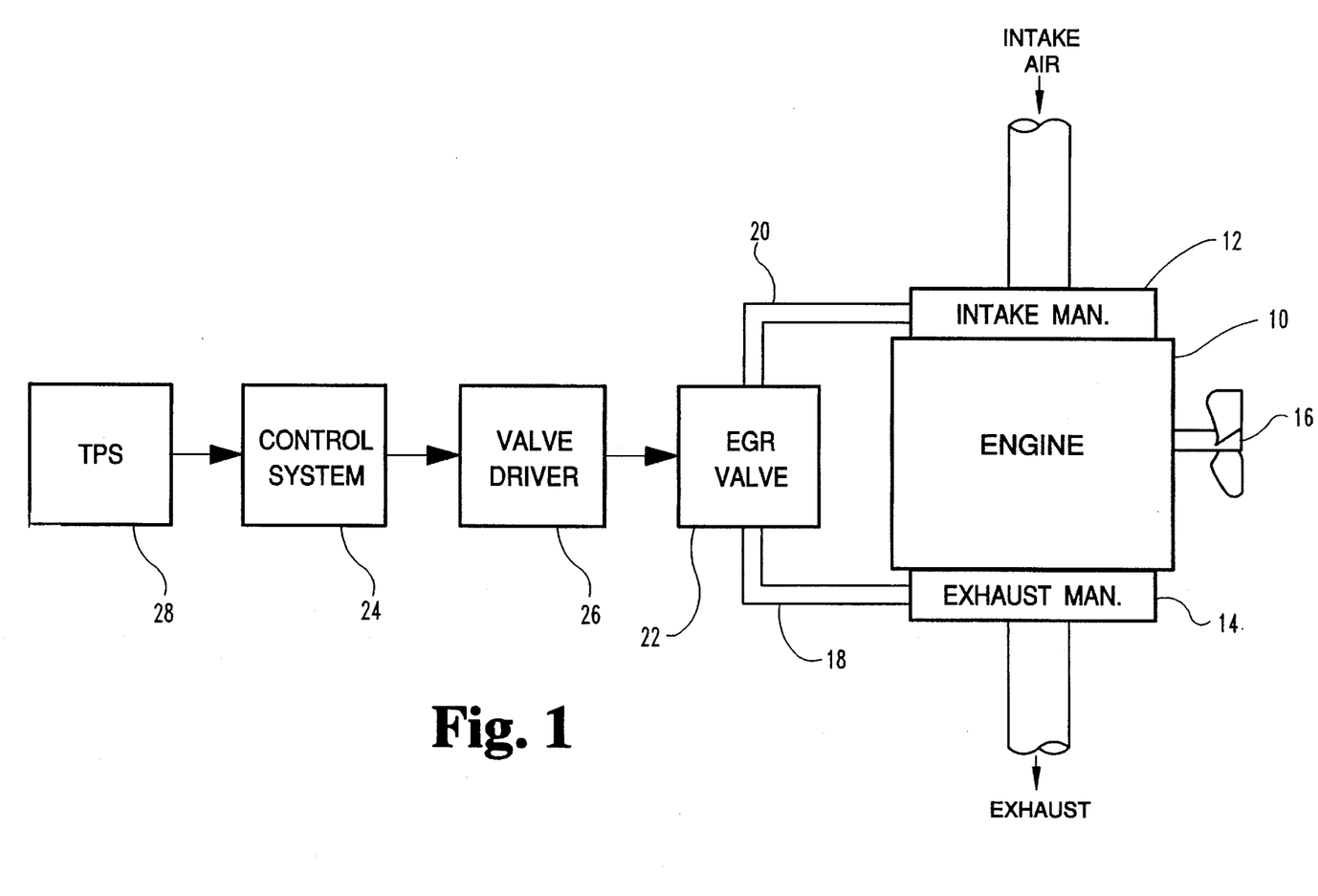
FIG. 1 is a block diagram of an internal combustion engine, EGR valve and control system of the present invention.

Referring to FIG. 1, there is illustrated an engine 10 having an intake manifold 12 and an exhaust manifold 14. Intake air is introduced to the combustion engine 10 through the intake manifold 12. The combined air/fuel mixture is then combusted within the engine 10 in order to turn a drive shaft 16. Exhaust gases from the order to reduce $NO_x$ emissions from the engine 10, exhaust gas from combustion process are scavenged by the exhaust manifold 14. In the exhaust manifold 14 may be routed to the intake manifold 12 via passages 18 and 20. The flow of exhaust gas through the passages 18 and 20 is controlled by EGR valve 22. When EGR valve 22 is open, exhaust gas is free to flow from the exhaust manifold to the intake manifold, where it is mixed with intake air prior to combustion within the engine 10. When the EGR valve 22 is closed, no exhaust gas is introduced into the intake manifold 12, therefore the engine combustion gases are composed only of the intake air. The EGR valve 22 is under the control of a control system 24 which acts through a valve driver 26. The output of control system 24 is based upon a single input, namely a throttle position sensor 28. The control system 24 is designed so that it is operative to turn off the EGR valve 22 at any time when the recirculation of exhaust gases would have an unacceptably detrimental effect on the performance of the engine 10. The control system 24 makes the EGR valve position determination based solely upon the input from the throttle position sensor 28.

Figure 2:
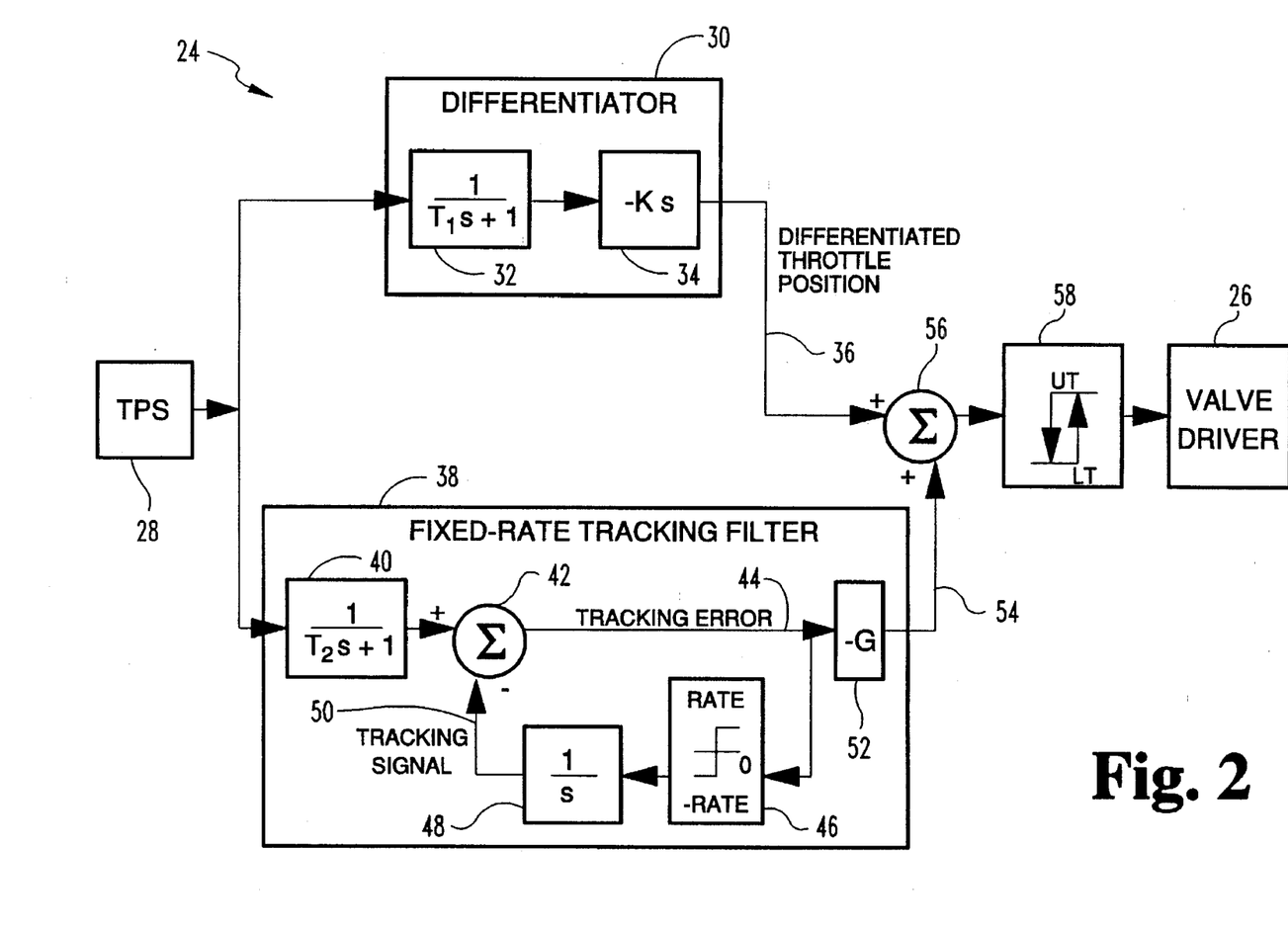
FIG. 2 is a block diagram of a first embodiment control system of the present invention.

Referring now to FIG. 2, a first embodiment of the control system 24 is illustrated in greater detail. The throttle position sensor 28 produces an analog voltage at its output which is proportional to the position of the engine throttle. Such throttle position sensors are well known in the art. The output voltage from the throttle position sensor 28 is input to a lag-lead compensated filter 30, which functions as a differentiator. The filter 30 includes a low-pass filter 32 with a filter constant of $T_1$, as well as a differentiating lead filter 34 with a lead-gain of -K. The output of differentiator 30 is a differentiated throttle position signal 36. The differentiated throttle position signal 36 is representative of the instantaneous rate of change of the output signal from the throttle position sensor 28. The output signal from the throttle position sensor 28 is additionally used as an input to a fixed-rate tracking filter 38. The throttle position sensor 28 output signal is initially filtered by a low-pass filter 40 having a filter constant of $T_2$. The output of filter 40 is input to summation block 42 which produces a tracking error signal 44. The tracking error 44 is introduced into a feedback path by input to rate adjustment block 46 and integrator 48. Rate adjustment block 46 operates by adding a predetermined RATE value to the tracking signal 50 when the tracking error 44 is positive, and subtracting a predetermined RATE value from the tracking signal 50 when the tracking error 44 is negative. The tracking signal 50 will therefore track the input to the fixed-rate tracking filter 38, but its rate of change is limited by the specified RATE value in the rate adjustment block 46. The tracking signal 50 is therefore limited to a maximum rate of change no matter how fast the input from the throttle position sensor 28 changes. The difference between the input from the throttle position sensor 28 and the tracking signal 50 is computed by the summation block 42 in order to produce the tracking error 44. The tracking error 44 is amplified by a gain of -G at block 52 in order to produce the output of the fixed-rate tracking filter 38. This output is the tracking error 54.

The differentiated throttle position signal 36 and the tracking error signal 54 are summed by summation block 56. The output of summation block 56 is input to a hysteretic comparator 58. The output of the hysteretic comparator 58 is used to activate valve driver 26. The hysteretic comparator 58 functions by turning the EGR valve 22 off whenever the output of the summation block 56 exceeds the upper threshold of the comparator 58. The EGR valve 22 is turned back on when the output of the summation block 56 has decayed below the lower threshold of the comparator 58.

The primary purpose of the differentiator 30 is that it provides immediate triggering response of the EGR valve 22. As soon as a change in the throttle position sensor 28 output is recognized, the differentiator 30 creates a pulse in the differentiated throttle position signal 36 which, if large enough, will turn off the EGR valve 22. It is therefore necessary that the low-pass filter 34 filter the throttle position sensor 28 output only enough to remove any noise, but not so much that there is a chance of missing a transient in the input signal. The gain, K, is used to tune the differentiator 30 amplitude for a desired triggering response. On the other hand, the primary purpose of the fixed-rate tracking filter 38 is timing. The decay rate of the tracking error 54, in its later stages, is governed by RATE. Therefore, rate can be used to tune the time that the EGR valve 22 is turned off. The gain, G, is used to tune the fixed-rate tracking filter 38 for the desired timing response. Neither the differentiator 30 nor the fixed-rate tracking filter 38 are able to adequately control the EGR valve 22 independently. When either filter is used alone, the EGR valve 22 does not always trigger when desired, it sometimes triggers at undesired times, and unacceptable exhaust emissions are produced by the engine 10. However, the use of the two filters 30 and 38 together complement each other very well. The specialized purposes of each filter provide the controller 24 with independently varying trigger and off time. The differentiator 30 variables are used to tune the triggering response while the fixed-rate tracking filter 38 variables are used to tune the off timing. The two gains, K and G, are used to scale the relative impact of the two filters upon the control system 24. Further adjustment of the control system 24 is possible by adjustment of the upper and lower thresholds of the hysteretic comparator 58.

Figure 3A:
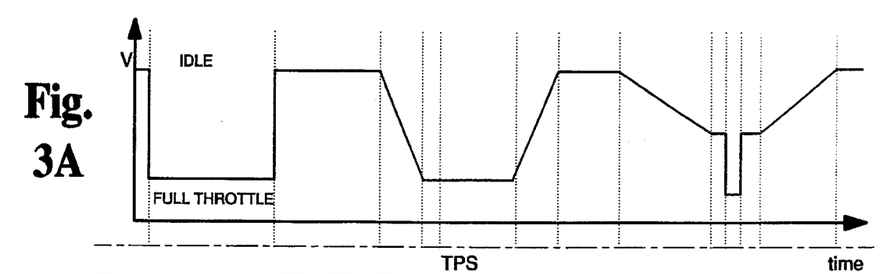
FIGS. 3A–E are graphs of voltage vs. time for various signals in the control system of FIG. 2.

Referring now to FIGS. 3A–E, there are illustrated various waveforms produced by the control system 24 of FIG. 2. In FIG. 3A, the output of the throttle position sensor 28 is graphed as a voltage varying with time. It will be appreciated by those skilled in the art that the throttle position sensor output varies between an idle condition and a full throttle condition either abruptly or with various slopes.

Figure 3B:
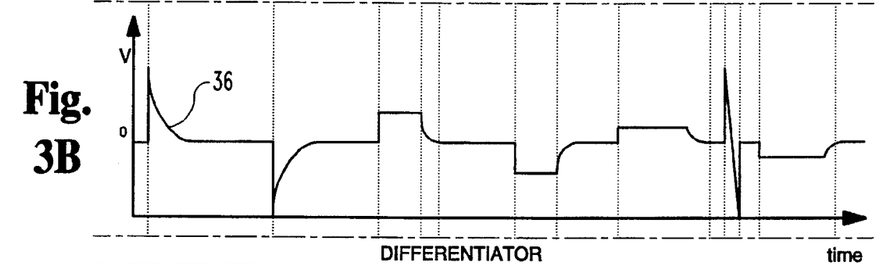

In FIG. 3B, the differentiated throttle position signal 36 is graphed as a voltage varying with time. The signal 36 represents the instantaneous slope of the throttle position sensor output illustrated in FIG. 3A. Abrupt transitions in the throttle position sensor output produce spikes in the differentiated throttle position signal 36, while smooth transitions of the throttle position sensor signal produce a constant, non-zero differentiated throttle position signal 36.

Figure 3C:
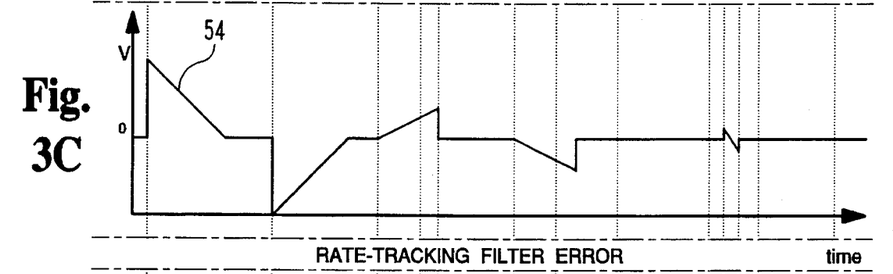

FIG. 3C illustrates the fixed-rate tracking filter output 54 as a voltage varying with time. The tracking error 54 is limited in its rate of transition by the rate adjustment block 46.

Figure 3D:
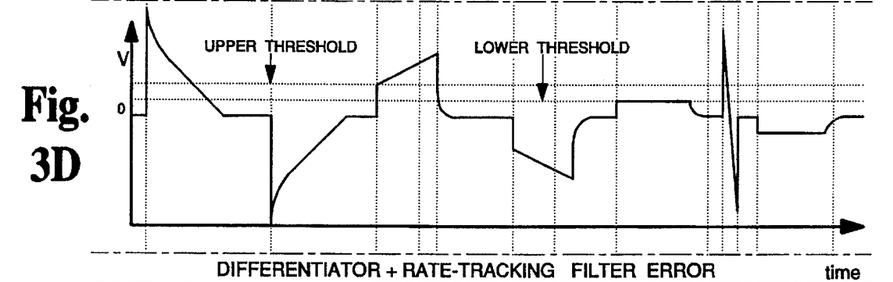

FIG. 3D illustrates the differentiated throttle position signal 36 added to the tracking error signal 54 in order to produce the composite signal output by the summation block 56. It will be appreciated by those skilled in the art that it is the differentiated throttle position signal 36 which causes the composite signal to exceed the upper threshold of the hysteretic comparator 58, while it is the controlled decay of the tracking error signal 54 which determines when the composite signal decays below the lower threshold of the hysteretic comparator 58.

Figure 3E:
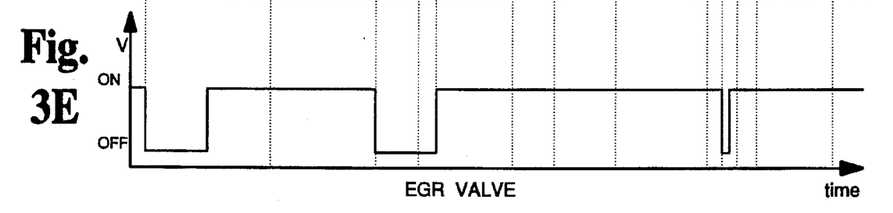

FIG. 3E illustrates the turning off and on of the EGR valve 22 based upon the composite signal of FIG. 3D exceeding the upper threshold or decreasing below the lower threshold, respectively. It can be seen that the output of the differentiator 30 causes the EGR valve to turn off, while the time constant of decay (RATE) in the fixed-rate tracking filter 38 establishes how long the EGR valve 22 will remain off. The differentiator 30 is therefore used to optimize the triggering of the EGR valve 22, while the fixed-rate tracking filter 38 is used to optimize the EGR valve 22 off timing.

Figure 4:
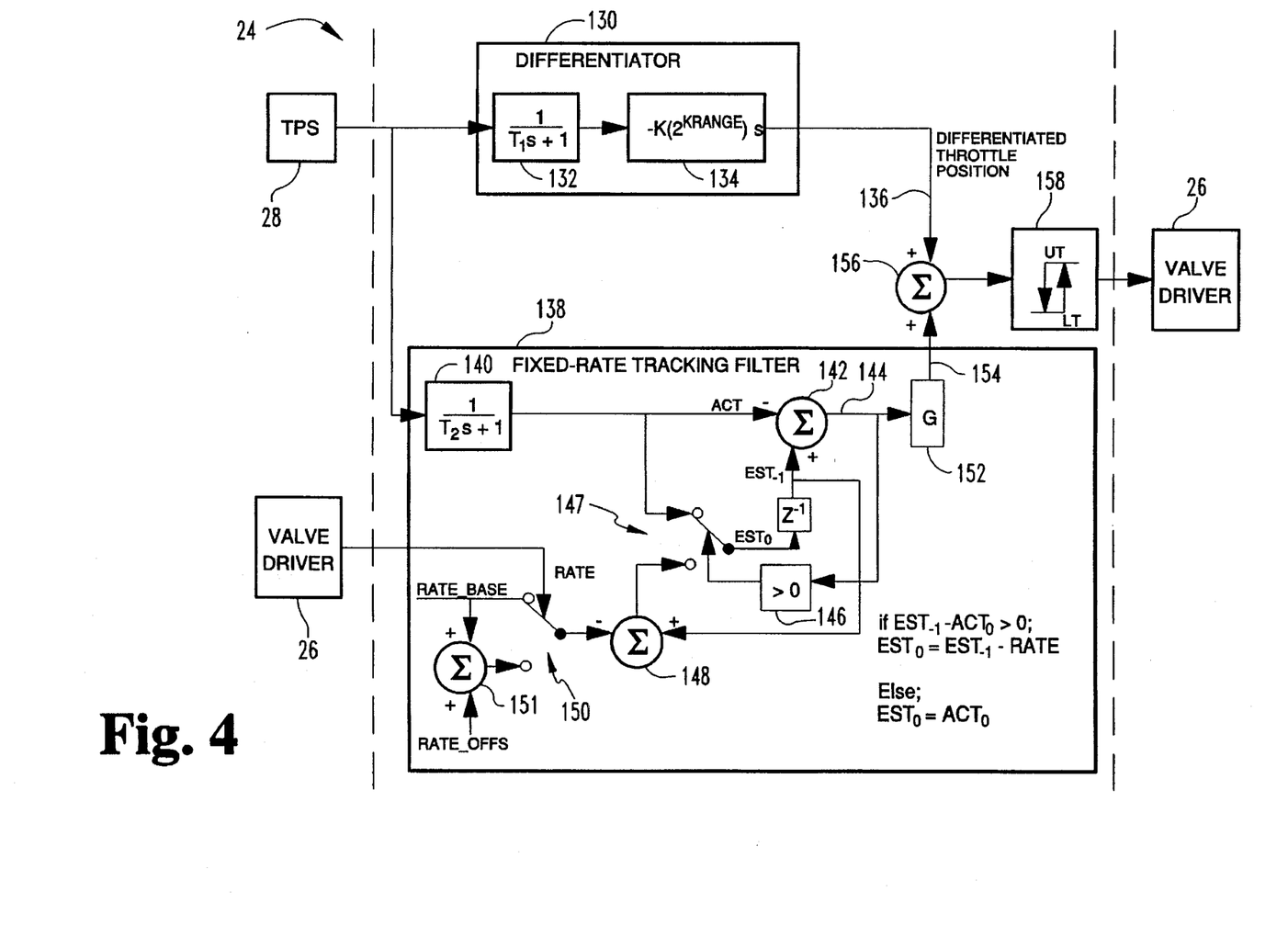
FIG. 4 is a block diagram of a second embodiment control system of the present invention.

Referring now to FIG. 4, there is illustrated a second embodiment of the EGR control system 24 of the present invention. The output of the throttle position sensor 28 is input to a differentiating filter 130, which comprises a first order low-pass lag filter 132 having a filter constant of $T_1$, followed by a first order lead gain block 134. The lead gain is defined by $K(2^{KRANGE})$, where K is the base differentiator lead gain and KRANGE specifies the range of K. The output of the differentiator 130 is the differentiated throttle position 136. The second embodiment of control system 24 further includes a fixed-rate tracking filter 138 which is designed to track the filter input at a predetermined maximum rate and produce a tracking error output 54 proportional to the difference between the input and the tracking signal. The output of the throttle position sensor 28 is input to a first order low-pass filter 140 having a time constant of $T_2$. The output of the filter 140 is the actual throttle position sensor voltage. This voltage is then subtracted by summation block 142 from the estimated throttle position sensor voltage of the last cycle ($EST_{-1}$) in order to generate a tracking error 144. This tracking error is amplified by a gain of G at block 152 in order to achieve the tracking error 154, which is the output of the fixed-rate tracking filter 138.

The estimated throttle position sensor voltage of the last cycle ($EST_{-1}$) is calculated in one of two ways, depending on whether the tracking error 144 is determined to be positive or nonpositive at block 146. The second embodiment fixed-rate tracking filter 138 only tracks at a limited rate on positive tracking errors 144. This is because negative tracking errors 144 are produced only during deceleration and have no effect on EGR control. Furthermore, limited rate tracking on negative errors would unnecessarily slow the control system down when transitioning from deceleration to acceleration, because the tracking rate would be rate-limited during the negative portion of the transition when no benefit is achieved by this limitation. Because the fixed-rate tracking filter 138 limits the tracking rate only on positive tracking errors, if the tracking error 144 is not positive, then the switch 147 is set to its upper position and $EST_{-1}$ is equated to the actual throttle position sensor voltage. If, on the other hand, the tracking error 144 is positive, then RATE is subtracted at summation block 148 from the estimated throttle position sensor voltage of the last loop cycle ($EST_{-1}$) to generate the estimated throttle position sensor voltage of the current loop cycle ($EST_0$). In this condition, the switch 147 is set to its lower position. The tracking rate applied to $EST_{-1}$ depends upon whether the EGR valve 22 is turned on or off. When the EGR valve 22 is turned on, as indicated by the output of valve driver 26, the switch 150 is set to its upper position. In this position, a base rate is applied to summation block 148 to be subtracted from $EST_{-1}$. When the EGR valve 22 is turned off, the larger tracking rate is used, and the switch 150 is set to its lower position. In this case, the base rate is summed to a rate offset by summation block 151, the output of which is then applied to summation block 148 in order to be subtracted from $EST_{-1}$.

The remainder of the second embodiment control system of FIG. 4 operates in an identical fashion to the first embodiment control system of FIG. 2. The differential throttle position signal 136 is summed with the tracking error 154 in summation block 156. The output of summation block 156 is applied to a hysteretic comparator 158 which is used to drive valve driver 26. The second embodiment control system of FIG. 4 therefore provides two parallel filters: a differentiator filter 130 and a valve position and throttle direction compensated rate-tracking filter 138. The first filter 130 is a lag-lead compensated differentiator which provides a signal essentially based on the instantaneous rate of change of the throttle position sensor signal. The primary purpose of the differentiator 130 is to provide immediate triggering of the EGR valve 22. The second filter is a more complex rate-tracking filter 138. It determines an estimated throttle position sensor signal which tracks the actual throttle position sensor signal with time, but can only change by a given maximum rate. The output of the filter 138 is the error between the estimated throttle position sensor signal and the actual throttle position sensor signal. The rate used to track the actual throttle position sensor signal is dependent on the current EGR valve position (on or off). Tracking is unidirectional in that the fixed-rate tracking only applies to throttle movements that imply a vehicle acceleration. Throttle movements that imply a vehicle deceleration produce an estimated throttle position signal equal to the actual throttle position signal. The filter 138 has the primary purpose of controlling the time which the EGR valve 22 remains off.

The outputs of the filters 130 and 138 are summed and fed into a hysteretic comparator 158 which drives a digital output to open or close the EGR valve 22. For steady state throttle position, the output of this filter combination is zero and the EGR valve 22 is turned on. During negative throttle position sensor transients (acceleration), the output increases with rate and amplitude of throttle change. Thus, the hysteretic comparator 158 turns off the EGR valve 22 during sufficiently large negative throttle transients.

Figure 5:
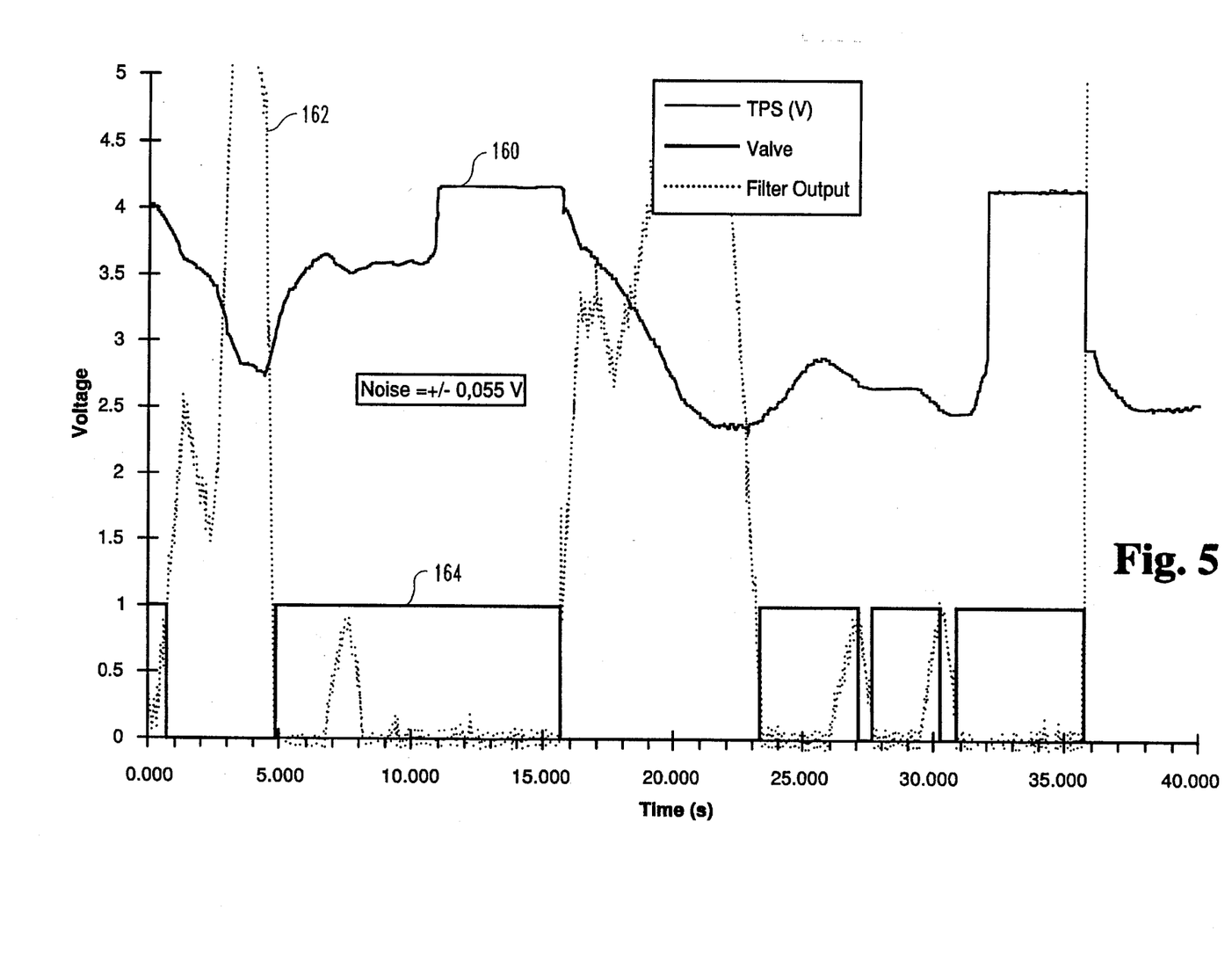
FIG. 5 is a graph of voltage vs. time for several signals in the control system of FIG. 4.

Referring now to FIG. 5, several waveforms produced by the control system of FIG. 4 are plotted together as voltages varying with time. The waveform 160 is the output of the throttle position sensor 28. The waveform 162 represents the output of the summation block 156. It will be appreciated by those skilled in the art that the waveform 162 is non-zero only when the waveform 160 is decreasing (indicating acceleration of the engine). The waveform 164 represents the output of the hysteretic comparator 158. The waveform 164 turns the EGR valve 22 on whenever the filter output 162 is substantially zero and turns the EGR valve 22 off whenever the filter output 162 exceeds the upper threshold of the hysteretic comparator 158, which is approximately 1 volt in the illustration of FIG. 5. The waveforms of FIG. 5 were generated using a Cummins B-series 175 hp engine operating under the control system of FIG. 4.

While the invention has been illustrated and described in the drawings and foregoing description, the same is to be considered as illustrative and not restrictive in character, it being understood that only preferred embodiment has been shown and described and that all changes and modifications that come within the spirit of the invention are desired to be protected. For example, the control system of the present invention has been illustrated herein in relation to exhaust gas recirculation control in an internal combustion engine, however those skilled in the art will appreciate that the present invention is equally applicable for control of any system where it is desired to control the triggering and timing of a device based upon the variations in an input signal. Furthermore, it will be appreciated by those skilled in the art that the functions of the control system of the present invention may be implemented by any signal processing device comprising either hardware, software, or a combination of the two. Consequently, the appended claims comprehend such applications and implementations.

What is claimed is:

1. A control system operable to receive an input signal and generate a system output signal, comprising:

a first signal processor operable to produce a first signal processor output signal based upon a rate of change of the input signal; and a second signal processor operable to produce a tracking signal which tracks the input signal over time, the tracking signal not exceeding a predetermined maximum rate of change, and further operable to produce a second signal processor output signal equal to a difference between the input signal and the tracking signal;

wherein the system output signal comprises a summation of the first signal processor output signal and the second signal processor output signal.

2. The control system of claim 1, wherein the first signal processor comprises a differentiating filter.

3. The control system of claim 2, wherein the differentiating filter comprises a lag-lead compensated differentiator.

4. The control system of claim 3, wherein the differentiator comprises:

a low-pass filter; and a gain stage coupled to the low-pass filter.

5. The control system of claim 1, wherein the second signal processor comprises a fixed-rate tracking filter.

6. The control system of claim 1, wherein the second signal processor compares the tracking signal to the input signal and:

increases the tracking signal by a first predetermined amount if the tracking signal is less than the input signal; and decreases the tracking signal by a second predetermined amount if the tracking signal is greater than the input signal.

7. The control system of claim 6, wherein the second predetermined amount is chosen so that the tracking signal will equal the input signal.

8. The control system of claim 6, wherein the first predetermined amount is selected depending upon a magnitude of the system output signal.

9. The control system of claim 6, wherein the input signal is filtered prior to the comparison.

10. The control system of claim 1, wherein the system output signal is applied to a hysteretic comparator.

11. An exhaust gas recirculation control system for an internal combustion engine, comprising:

an input port adapted to receive an input signal indicitive of an engine operating parameter;

a first signal processor operatively coupled to the input port and operable to produce a first signal processor output signal based upon a rate of change of the input signal;

a second signal processor operable to produce a tracking signal which tracks the input signal over time, the tracking signal not exceeding a predetermined maximum rate of change, and further operable to produce a second signal processor output signal equal to a difference between the input signal and the tracking signal; and an output port operatively coupled to the first and second signal processor and to an exhaust gas recirculation valve and operable to apply a system output signal to the exhaust gas recirculation valve;

wherein the system output signal comprises a summation of the first signal processor output signal and the second signal processor output signal.

12. The exhaust gas recirculation control system of claim 11, wherein the input signal is a throttle position sensor output.

13. The exhaust gas recirculation control system of claim 11, wherein the output signal is operative to turn the exhaust gas recirculation valve on and off.

14. The exhaust gas recirculation control system of claim 11, wherein the first circuit comprises a differentiating filter.

15. The exhaust gas recirculation control system of claim 11, wherein the second circuit comprises a fixed-rate tracking filter.

16. The exhaust gas recirculation control system of claim 13, wherein the first signal processor output signal turns off the exhaust gas recirculation valve and the second signal processor output signal determines how long the exhaust gas recirculation valve remains off.

17. The exhaust gas recirculation control system of claim 11, wherein the output signal is applied to the exhaust gas recirculation control valve through a hysteretic comparator.

18. The exhaust gas recirculation control system of claim 11, wherein the second signal processor compares the tracking signal to the input signal and;

increases the tracking signal by a first predetermined amount if the tracking signal is less than the input signal; and decreases the tracking signal by a second predetermined amount if the tracking signal is greater than the input signal.

19. An internal combustion engine providing exhaust gas recirculation comprising:

an air induction path;

an exhaust path;

at least one combustion chamber coupled to the air induction path and the exhaust path;

an exhaust gas recirculation control valve selectively operable to couple the exhaust path to the air induction path;

a control system coupled to the exhaust gas recirculation control valve, the control system comprising:

an input port adapted to receive an input signal indicitive of an engine operating parameter;

a first signal processor operatively coupled to the input port and operable to produce a first signal processor output signal based upon a rate of change of the input signal;

a second signal processor operable to produce a tracking signal which tracks the input signal over time, the tracking signal not exceeding a predetermined maximum rate of change, and further operable to produce a second signal processor output signal equal to a difference between the input signal and the tracking signal;

an output port operatively coupled to the first and second signal processors and operable to apply a system output signal to the exhaust gas recirculation valve;

wherein the system output signal comprises a summation of the first signal processor output signal and the second signal processor output signal.

20. The internal combustion engine of claim 19, wherein the input signal is a throttle position sensor output.

21. The internal combustion engine of claim 19, wherein the output signal is operable to turn the exhaust gas recirculation valve on and off.

22. The internal combustion engine of claim 19, wherein the first signal processor comprises a differentiating filter.

23. The internal combustion engine of claim 19, wherein the second signal processor comprises a fixed-rate tracking filter.

24. The internal combustion engine of claim 21, wherein the first signal processor output signal turns off the exhaust gas recirculation valve and the second signal processor output signal determines how long the exhaust gas recirculation valve remains off.

25. The internal combustion engine of claim 19, wherein the output signal is applied to the exhaust gas recirculation control valve through a hysteretic comparator.

26. The internal combustion engine of claim 19, wherein the second signal processor compares the tracking signal to the input signal and:
- increases the tracking signal by a first predetermined amount if the tracking signal is less than the input signal; and
- decreases the tracking signal by a second predetermined amount if the tracking signal is greater than the input signal.

27. A method of controlling a device, comprising the steps of:
(a) receiving an input signal;
(b) generating a first output signal based upon a rate of change of the input signal;
(c) generating a tracking signal which tracks the input signal over time, the tracking signal not exceeding a predetermined maximum rate of change;
(d) generating a second output signal equal to a difference between the input signal and the tracking signal;
(e) summing the first output signal and the second output signal to generate a composite output signal; and
(f) applying the composite output signal to the device.

28. The method of claim 27, wherein step (b) further comprises the steps of:
(b.1) low-pass filtering the input signal; and
(b.2) amplifying the filtered input signal.

29. The method of claim 27, wherein step (c) further comprises the steps of:
(c.1) generating a tracking signal;
(c.2) increasing the tracking signal by a first predetermined amount if the tracking signal is less than the input signal; and
(c.3) decreasing the tracking signal by a second predetermined amount if the tracking signal is greater than the input signal.

30. A method of controlling an exhaust gas recirculation valve on an internal combustion engine, comprising the steps of:
(a) receiving an input signal indicative of an engine operating parameter;
(b) generating a first output signal based upon a rate of change of the input signal;
(c) generating a tracking signal which tracks the input signal over time, the tracking signal not exceeding a predetermined maximum rate of change;
(d) generating a second output signal equal to a difference between the input signal and the tracking signal;
(e) summing the first output signal and the second output signal to generate a composite output signal; and
(f) applying the composite output signal to the exhaust gas recirculation valve.

31. The method of claim 30, wherein step (a) comprises receiving an input signal indicative of throttle position.

32. The method of claim 30, wherein step (f) is operable to turn the exhaust gas recirculation valve on and off.

33. The method of claim 30, wherein the first output signal turns off the exhaust gas recirculation valve and the second output signal determines how long the exhaust gas recirculation valve remains off.

34. The method of claim 30, wherein step (b) further comprises the steps of:
(b.1) low-pass filtering the input signal; and
(b.2) amplifying the filtered input signal.

35. The method of claim 30, wherein step (c) further comprises the steps of:
(c.1) generating a tracking signal;
(c.2) increasing the tracking signal by a first predetermined amount if the tracking signal is less than the input signal; and
(c.3) decreasing the tracking signal by a second predetermined amount if the tracking signal is greater than the input signal.

* * * * *

UNITED STATES PATENT AND TRADEMARK OFFICE
CERTIFICATE OF CORRECTION

PATENT NO. : 5,533,489

DATED : July 9, 1996

INVENTOR(S) : Vincent P. Socci et al.

It is certified that error appears in the above-identified patent and that said Letters Patent is hereby corrected as shown below:

In item 57 of the title page, line 6, please delete the second period.

In column 1, line 22, after "and", please insert --pressure. An increase in combustion temperature causes an increase in the --.

In column 1, lines 23 and 24, please delete "pressure. An increase in combustion temperature causes an increase in the".

In column 1, line 60, please change "NO" to --$NO_x$--.

In column 4, line 55, after "the", please insert --combustion process are scavenged by the exhaust manifold 14. In--.

In column 4, lines 56 and 57, please delete "combustion process are scavenged by the exhaust manifold 14. In".

In column 5, line 23, "The output" should begin a new paragraph.

Signed and Sealed this

Seventh Day of January, 1997

*Attest:*

BRUCE LEHMAN

*Attesting Officer*  Commissioner of Patents and Trademarks